United States Patent
Marker et al.

(10) Patent No.: US 7,578,927 B2
(45) Date of Patent: Aug. 25, 2009

(54) GASOLINE AND DIESEL PRODUCTION FROM PYROLYTIC LIGNIN PRODUCED FROM PYROLYSIS OF CELLULOSIC WASTE

(75) Inventors: Terry L. Marker, Des Plaines, IL (US); John A. Petri, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 155 days.

(21) Appl. No.: 11/468,813

(22) Filed: Aug. 31, 2006

(65) Prior Publication Data
US 2008/0053870 A1    Mar. 6, 2008

(51) Int. Cl.
*C10G 1/00* (2006.01)
(52) U.S. Cl. .................................. 208/67; 585/242
(58) Field of Classification Search ........... 208/67; 585/242
See application file for complete search history.

(56) References Cited

U.S. PATENT DOCUMENTS

| | | | | |
|---|---|---|---|---|
| 3,801,495 | A | * 4/1974 | Gould | 208/97 |
| 5,180,868 | A | * 1/1993 | Baker et al. | 585/240 |
| 5,605,551 | A |   2/1997 | Scott et al. | 44/307 |
| 5,959,167 | A |   9/1999 | Shabtai et al. | 585/242 |
| 6,043,392 | A |   3/2000 | Holtzapple et al. | 562/513 |
| 6,676,716 | B2 |   1/2004 | Fujimura et al. | 48/197 FM |

* cited by examiner

*Primary Examiner*—Tam M Nguyen
(74) *Attorney, Agent, or Firm*—Arthur E Gooding

(57) ABSTRACT

A process for the conversion of biomass to a liquid fuel is presented. The process includes the production of diesel and naphtha boiling point range fuels by hydrocracking of pyrolysis lignin extracted from biomass.

16 Claims, 1 Drawing Sheet

Pyrolysis Oil Processing Route

Pyrolysis Oil Processing Route
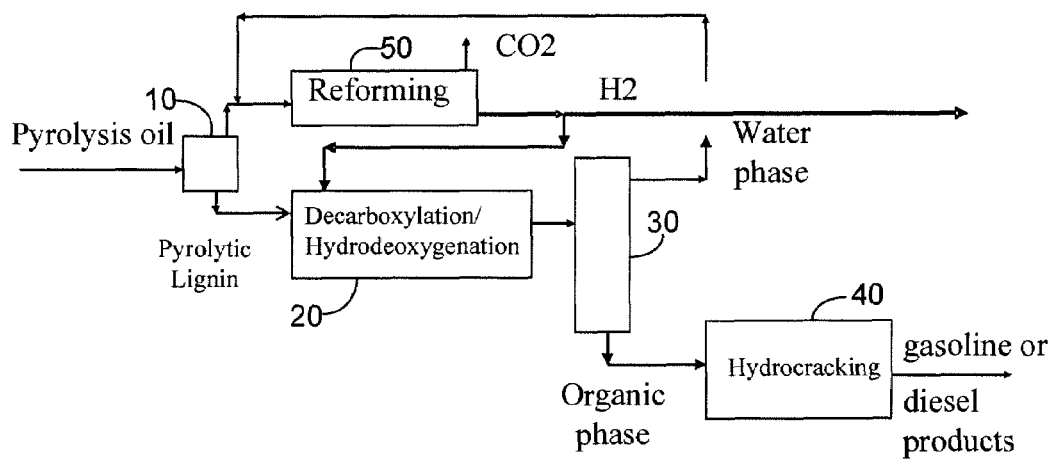
FIGURE

GASOLINE AND DIESEL PRODUCTION FROM PYROLYTIC LIGNIN PRODUCED FROM PYROLYSIS OF CELLULOSIC WASTE

FIELD OF THE INVENTION

This invention relates to processes for obtaining hydrocarbons from biomass. More particularly, this invention relates to the treatment of lignin and cellulosic waste produced from pyrolysis of biomass to produce light aromatics and gasoline.

BACKGROUND OF THE INVENTION

Renewable energy sources are of increasing importance. They are a means of reducing dependence on imported oil and provide a substitute for fossil fuels. Also, renewable resources can provide for basic chemical constituents to be used in other industries, such as chemical monomers for the making of plastics. Biomass is a renewable resource that can provide some of the needs for sources of chemicals and fuels.

Biomass includes, but is not limited to, lignin, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. Biomass is also generated in many everyday processes as a waste product, such as waste material from crops. In addition, biomass contributes to the removal of carbon dioxide from the atmosphere as the biomass grows. The use of biomass can be one process for recycling atmospheric carbon while producing fuels and chemical precursors. Biomass when heated in an environment with low or no oxygen will generate a liquid product known as pyrolysis oil.

It is difficult and uneconomical to use pyrolysis oil directly, but new and improved processes can make fuels that work with engines that are currently distributed around the world without requiring upgrades to those engines.

SUMMARY OF THE INVENTION

The invention provides a process for producing high yields of naphtha and diesel related products from biomass. Pyrolysis oil generated from biomass is separated into an oil phase stream and a pyrolytic lignin stream. The pyrolytic lignin stream is rich in aromatic hydrocarbon rings, and is treated in a decarboxylation/hydrodeoxygenation unit generating a deoxygenated oil stream. The deoxygenated oil stream is separated to produce an aqueous phase and an organic phase. The organic phase is further treated in a hydrocracking unit under mild hydrocracking conditions to produce a hydrocarbon product stream. The product stream comprises aromatic and naphthenic compounds that are useful as gasoline and naphtha, or as additives to gasoline products.

Other objects, advantages and applications of the present invention will become apparent to those skilled in the art after a detailed description of the invention.

BRIEF DESCRIPTION OF THE DRAWING

The FIGURE is a process flow scheme for one embodiment of the present invention.

DETAILED DESCRIPTION OF THE INVENTION

In the U.S. and worldwide, there are huge amounts of cellulosic waste, or biomass, which is not utilized, but is left to decay, often in a landfill, or just in an open field. The material includes large amounts of wood waste products, and leaves and stalks of crops or other plant material that is regularly discarded and left to decay in fields. This material can be pyrolyzed to make a pyrolysis oil, but due to the high water content of the pyrolysis oil, often greater than 25%, high total acid number of approximately 70, and phase incompatibility with petroleum based materials, pyrolysis oil has found little use.

The current invention is a process for substantially converting pyrolytic lignin material into naphtha and diesel boiling range components, having low acidity and ultra-low sulfur content. The pyrolytic lignin is separated from pyrolysis oil and contains potentially high value products in the form of aromatic and naphthenic compounds. Pyrolytic lignin is a complex structure that comprises aromatic rings that are linked by oxygen atoms or carbon atoms, and can be broken into smaller segments when decarboxylated or hydrodeoxygenated and further reduced under mild hydrocracking conditions, while maintaining the aromatic ring structures.

In one embodiment, as shown in the FIGURE, pyrolysis oil is separated in a separation unit 10, generating a pyrolytic lignin stream and a water rich phase stream comprising organic compounds. The pyrolytic lignin stream is passed to a hydrotreating unit 20, generating a deoxygenated light oil stream. The hydrotreating unit 20 performs decarboxylation and hydrodeoxygenation of the pyrolytic lignin breaking the bonds holding the aromatic rings together by breaking the oxygen linkages and forming water and $CO_2$ from the oxygen and leaving smaller molecules comprising an aromatic ring, such as alkylbenzenes and polyalkylbenzenes. The deoxygenated light oil stream is passed to a separation unit 30 where the deoxygenated light oil is separated into an aqueous stream and an organic stream. The organic stream is passed to a hydrocracking unit 40 where mild hydrocracking is performed, thereby generating a product stream. The product stream comprises aromatic and naphthenic compounds for use in gasoline or naphtha boiling range products. A small amount of diesel is produced which can be put into diesel boiling range products The product stream can be further processed by passing the product stream to a reforming unit. The reforming unit reduces the naphthenic content and generates an aromatic rich product stream for use in gasoline.

The separation of the pyrolysis oil in the separation unit 10 can be performed by adding water to the pyrolysis oil creating a mixture comprising a lighter water rich phase stream and a heavier lignin rich phase. The two phases are separated using known technology into the water rich phase for subsequent reforming, and the pyrolytic lignin stream comprising lignin. Since the pyrolytic lignin is denser than the water rich phase of the pyrolysis oil, examples of separation processes include gravity separation, or centrifuging.

In another embodiment, the process comprises passing the water rich phase stream to a reforming unit 50. The reforming unit 50 acts on the water rich phase to generate a hydrogen stream. The reforming of the water rich stream can be performed with either steam reforming or through partial oxidation. The hydrogen stream generated from the reforming can be passed to the hydrotreating unit 20 for the decarboxylation and hydrodeoxygenation of the lignin.

The pyrolytic lignin stream is hydrotreated to decarboxylate and hydrodeoxygenate the lignin by partial cracking of the pyrolytic lignin molecules into smaller molecules comprising an aromatic ring. Decarboxylation minimizes the hydrogen consumption during the breaking of the bonds holding the aromatic units in the lignin molecules together. This also limits the amount of hydrogenation of the aromatic rings. The hydrotreating is operated at a pressure from about 3.4 MPa (500 psia) to about 14 MPa (2000 psia), and preferably is operated at a pressure from about 3.4 MPa (500 psia) to about 12 MPa (1800 psia). This is lower than the normal operation pressures for hydrotreating pyrolysis oils which is in the range from 14 MPa (2000 psia) to 21 MPa (3000 psia).

In an alternate embodiment, pyrolysis oil is separated in a separation unit 10, generating a pyrolytic lignin stream and a water rich phase stream. The pyrolytic lignin stream is passed to a hydrotreating unit 20, generating a deoxygenated light oil stream. The hydrotreating unit 20 decarboxylates and hydrodeoxygenates the pyrolytic lignin to generate a deoxygenated light oil stream. The deoxygenated light oil stream is passed to a hydrocracking unit 40 where a product stream is generated comprising aromatic compounds for use in naphtha boiling range products, or gasoline.

In an alternative to the above embodiments, the deoxygenated light oil stream is drawn off as a vapor before passing the deoxygenated light oil stream to the hydrocracking unit 40, or to the separation unit 30. This promotes a longer residence time for the liquid pyrolytic lignin phase.

The organic phase stream is separated from the deoxygenated lignin stream and further processed through a cracking process. The hydrocracking unit is operated at a pressure from about 3.4 MPa (500 psia) to about 14 MPa (2000 psia), and preferably is operated at a pressure from about 3.4 MPa (500 psia) to about 12 MPa (1800 psia). Operating conditions for the hydrocracking unit further include operating at a temperature between about 260° C. (500° F.) and 455° C. (850° F.), and preferably at a temperature between about 340° C. (650° F.) and 435° C. (810° F.).

The hydrocracking unit includes a catalyst having a cracking function. The catalyst is a combined zeolitic and amorphous silica-alumina catalyst with a metal deposited on the catalyst. The catalyst includes at least one metal selected from nickel (Ni), chromium (Cr), molybdenum (Mo), tungsten (W), cobalt (Co), rhodium (Rh), iridium (Ir), ruthenium (Ru), and rhenium (Re). In one embodiment, the catalyst includes a mixture of the metals Ni and Mo on the catalyst. The catalyst is preferably a large pore catalyst that provides sufficient pore size for allowing larger molecules into the pores for cracking to smaller molecular constituents. The metal content deposited on the catalysts used are deposited in amounts ranging from 0.1 wt. % to 20 wt. %, with preferred values for the metals including, but not limited to, nickel in a range from 0.5 wt. % to 10 wt. %, tungsten in a range from 5 wt. % to 20 wt. %, and molybdenum in a range from 5 wt. % to 20 wt. %. The metals can also be deposited in combinations on the catalysts with preferred combinations being Ni with W, and Ni with Mo.

Zeolites used for the catalysts include, but are not limited to, beta zeolite, Y-zeolite, MFI type zeolites, mordenite, silicalite, SM3, and faujasite.

EXAMPLE

The pyrolysis oil was separated into two streams before hydrotreating the pyrolytic lignin, a pyrolytic lignin stream and a water soluble pyrolysis oil phase stream. The separation was performed using two methods, a water precipitation method and a density method. The pyrolytic lignin has an enriched carbon content and a reduced oxygen content relative to the pyrolysis oil before separation, as shown in Table 1. The amount of pyrolytic lignin that is recoverable from the pyrolysis oil before hydrotreating is about 30% by weight of the pyrolysis oil. Different separation methods can yield slightly different results. The elemental analyses in Table 1 are shown on a moisture free basis as indicated by "mf".

TABLE 1

|  | Pyrolysis Oil | Pyrolytic Lignin | Water Soluble Pyrolysis Oil | Pyrolytic Lignin | Water Soluble Pyrolysis Oil |
| --- | --- | --- | --- | --- | --- |
| Weight % | 100 | 27 | 73 | 32 | 68 |
| Separation method |  | Water precipitation | Water precipitation | Density | Density |
| % C mf | 44.7 | 69 | 35.8 | 62.3 | 36.5 |
| % H mf | 7.2 | 6.9 | 7.3 | 6.9 | 7.3 |
| % N mf | 0.2 | 0.3 | 0.2 | 0.3 | 0.2 |
| % O mf | 47.9 | 23.8 | 56.7 | 30.5 | 56.0 |
| Heating value LHV Btu/lb | 6560 | 11800 | 4653 | 10330 | 4810 |

Based on the autoclave tests for production of naphtha boiling range and diesel boiling range products, the yields from pyrolytic lignin are shown in Table 2. The $CO_2$ yield is based on an atomic O balance based on the feed oxygen content and the amount of water collected in the products. The hydrogen consumption is estimated from an atomic H balance based on the feed and products hydrogen contents. The production of 2250 bpd of lignin is estimated from the yield of lignin from pyrolysis oil, and using an estimate of 7500 bpd of pyrolysis oil. About 30% of the pyrolytic lignin can be converted to gasoline type products.

TABLE 2

Yield from Hydrocracking Pyrolytic Lignin

|  | Wt % | Bpd |
|---|---|---|
| Feed |  |  |
| Pyrolytic lignin | 100 | 2250 |
| H2 | 4-5 |  |
| Products |  |  |
| Lt. ends | 15 |  |
| Gasoline | 30 | 1010 |
| Diesel | 8 | 250 |
| Water, CO2 | 51-52 |  |

Experiments were run to reduce the oxygen content and stabilize the product through hydrotreating and decarboxylation of the pyrolytic lignin. The hydrotreated lignin was subject to hydrocracking to produce naphtha and distillate range components. The experiments performed were batch experiments and were run in an autoclave. The hydrotreating of the lignin was compared with a commercial process from the Pacific Northwest National Labs (PNNL). Although there was a reduction in the liquid yield, there was an increase in the quality of the liquids. The tests showed a significant increase in oxygen removal, and a significant increase in the amount of naphtha overall yield, i.e. an increase of over 40% in the production of naphtha over the PNNL process.

TABLE 3

Comparison of hydrotreating methods for Pyrolytic Lignin

|  | PNNL HT | UOP HT |
|---|---|---|
| WHSV | 0.52 | 1.0 |
| LHSV | 0.22 | 0.68 |
| Catalyst | Pt/C | Ni/Mo |
| Pressure (psia) | 1900-2000 | 1500 |
| Liquid yield % | 55.6 | 40.8 |
| % oxygen removal | 60 | 93 |
| % oxygen in product | 19.5 | 5.9 |
| Acid number of product | 34 | 15 |
| % naphtha in liquid | 30 | 60 |

Additional results can be seen in Table 4 from a series of autoclave experiments. The experiments were run at temperatures from 350 C to 370 C and at a pressure of 10.4 MPa (1500 psig). The feed to catalyst ratios were from 3:1 to 6:1, the WHSV varied from 1 to 1.5 and the LHSV varied from 0.67 to 1.01. The results indicated high oxygen removal and good liquid yields of naphtha liquids and diesel liquids.

TABLE 4

Product Yield from Additional Pyrolytic Lignin Hydrotreating Experiments

|  | Product ranges |
|---|---|
| Water, % of feed | 7.5-33 |
| Naphtha, % | 19-30 |
| Diesel, % | 12-30 |
| Total liq., % | 38-60 |
| % oxygen removed | 90-96 |
| % O in naphtha | 1.3-8.6 |
| % O in diesel | 2.3-7.3 |

In addition, the gasoline content produced from autoclave experiments on pyrolytic lignin yielded a naphtha product with significant aromatic and naphthene content as shown in Table 5.

TABLE 5 properties of starting pyrolytic lignin vs. naphtha produced from pyrolytic lignin

|  | Pyrolytic lignin | gasoline |
|---|---|---|
| BP (10-90% pt) ° C. | Too heavy | 71-226 |
| Density | 1.2 | 0.81 |
| Acid number (mg KOH/g) | 168 |  |
| Oxygen, % (by dif) | 29.7 | 1.3 |
| % aromatics |  | 34.4 |
| % naphthenes |  | 39.1 |
| % olefins |  | 2.7 |
| % paraffins |  | 23.8 |

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A process for producing hydrocarbon products comprising:
    adding water to a mixture of pyrolysis oil and lignin;
    separating pyrolysis oil and lignin from the mixture comprising pyrolysis oil and lignin thereby generating a water rich phase stream and a pyrolytic lignin stream;
    passing the pyrolytic lignin stream to a hydrotreating unit thereby generating a deoxygenated light oil stream, wherein the hydrotreating unit is operated at a pressure in the range from about 5.5 MPa (800 psia) to about 8.3 MPa (1200 psia);
    passing the deoxygenated light oil stream to a separation unit thereby generating an aqueous stream and an organic stream;
    passing the organic stream to a hydrocracking unit and reacting the organic stream under mild hydrocracking conditions, thereby generating a product stream comprising hydrocarbon compounds useful for gasoline production or diesel fuel; and
    passing the water rich phase stream to a reforming unit, thereby generating a hydrogen stream.

2. The process of claim 1 further comprising passing the hydrogen stream to the hydrotreating unit.

3. The process of claim 1 wherein the hydrotreating unit is operated to maximize the decarboxylation of the pyrolytic lignin while minimizing the hydrogen consumption to minimize the hydrodeoxygenation.

4. The process of claim 1 wherein the hydrocracking unit is operated at a pressure between about 3.4 MPa (500 psia) to about 12 MPa (1800 psia).

5. The process of claim 4 wherein the hydrocracking unit is operated at a pressure between about 5.5 MPa (800 psia) to about 8.3 MPa (1200 psia).

6. The process of claim 1 wherein the hydrocracking unit is operated at a temperature between about 260° C. (500° F.) and 455° C. (850° F.).

7. The process of claim 6 wherein the hydrocracking unit is operated at a temperature between about 340° C. (650° F.) and 435° C. (810° F.).

8. The process of claim 1 wherein the hydrocracking unit is operated with a catalyst with a zeolite cracking function.

9. The process of claim 8 wherein the catalyst is a zeolitic and amorphous catalyst.

10. The process of claim 9 wherein the catalyst comprises a metal selected from the group consisting of Ni, Cr, Mo, W, Co, Rh, Ir, Ru, Re and mixtures thereof.

11. The process of claim 10 wherein the catalyst comprises a mixture of Ni and Mo metals.

12. The process of claim 10 wherein the catalyst comprises at least two metals selected from the group consisting of Ni, Cr, Mo, W and mixtures thereof.

13. The process of claim 1 wherein the hydrocracking of the organic stream comprises passing the organic stream over a large pore catalyst.

14. The process of claim 1 further comprising passing the product stream to a reforming unit thereby generating an aromatic rich product stream.

15. A process for producing hydrocarbon products comprising:

adding water to a mixture of pyrolysis oil and lignin;

separating pyrolysis oil and lignin comprising pyrolysis oil and lignin thereby generating a water rich phase stream and a pyrolytic lignin stream;

passing the pyrolytic lignin stream to a hydrotreating unit thereby generating a deoxygenated light oil stream, wherein the hydrotreating unit is operated at a pressure in the range from about 5.5 MPa (800 psia) to about 8.3 MPa (1200 psia);

passing the Light oil stream to a hydrocracking unit and reacting the light oil stream under mild hydrocracking conditions, thereby generating a product stream comprising hydrocarbon compounds; and passing the water rich phase stream to a reforming unit, thereby generating a hydrogen stream.

16. The process of claim 1 wherein the deoxygenated light oil stream is drawn off as a vapor from the hydrotreating unit and then passed to the hydrocracking unit.

* * * * *